United States Patent
Kachi

(10) Patent No.: US 9,866,618 B2
(45) Date of Patent: Jan. 9, 2018

(54) INFORMATION PROCESSING APPARATUS THAT UPLOADS IMAGES HELD BY A PLURALITY OF DEVICES TO SERVERS SET ON A DEVICE-BY-DEVICE BASIS, METHOD OF CONTROLLING THE SAME, AND STORAGE MEDIUM

(71) Applicant: CANON KABUSHIKI KAISHA, Tokyo (JP)

(72) Inventor: Yasushi Kachi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 14/497,701

(22) Filed: Sep. 26, 2014

(65) Prior Publication Data
US 2015/0095400 A1 Apr. 2, 2015

(30) Foreign Application Priority Data
Oct. 2, 2013 (JP) .................. 2013-207206

(51) Int. Cl.
*G06F 15/16* (2006.01)
*H04L 29/08* (2006.01)

(52) U.S. Cl.
CPC .......... *H04L 67/06* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 2004/0131282 A1* | 7/2004 | Yoshida | H04N 7/18 382/312 |
| 2007/0216959 A1* | 9/2007 | Yoshida | H04N 7/18 358/400 |
| 2010/0091879 A1* | 4/2010 | Akimoto | G06F 17/30265 375/240.24 |
| 2012/0002003 A1* | 1/2012 | Okita | H04L 12/1827 348/14.11 |
| 2012/0133679 A1* | 5/2012 | Kubota | H04L 29/08792 345/660 |

(Continued)

FOREIGN PATENT DOCUMENTS

JP 2002101373 A 4/2002
JP EP 1480439 A1 * 11/2004 ......... H04N 1/00132

*Primary Examiner* — Joseph E Avellino
*Assistant Examiner* — Phyllis A Book
(74) *Attorney, Agent, or Firm* — Rossi, Kimms & McDowell LLP

(57) ABSTRACT

An information processing apparatus capable of reducing the burden of user's operation for sharing uploaded images, in a case where image upload destinations set by the users using their own devices are different. The apparatus includes a device detection section that detects a device that holds image information, a device communication section that communicates with the detected device, and a server communication that communicates with a plurality of servers via a communication network. Server information indicative of an image upload destination set for each detected device is acquired via the device communication section. Image information held by each device is acquired via the device communication section. The acquired image information is uploaded to the servers corresponding to the server information.

11 Claims, 11 Drawing Sheets

(56) References Cited

U.S. PATENT DOCUMENTS

| | | | |
|---|---|---|---|
| 2012/0221639 A1* | 8/2012 | Mallet | G06Q 50/01 709/204 |
| 2014/0074932 A1* | 3/2014 | Mihara | H04L 67/06 709/204 |
| 2014/0253980 A1* | 9/2014 | Arai | H04N 1/00222 358/474 |

* cited by examiner

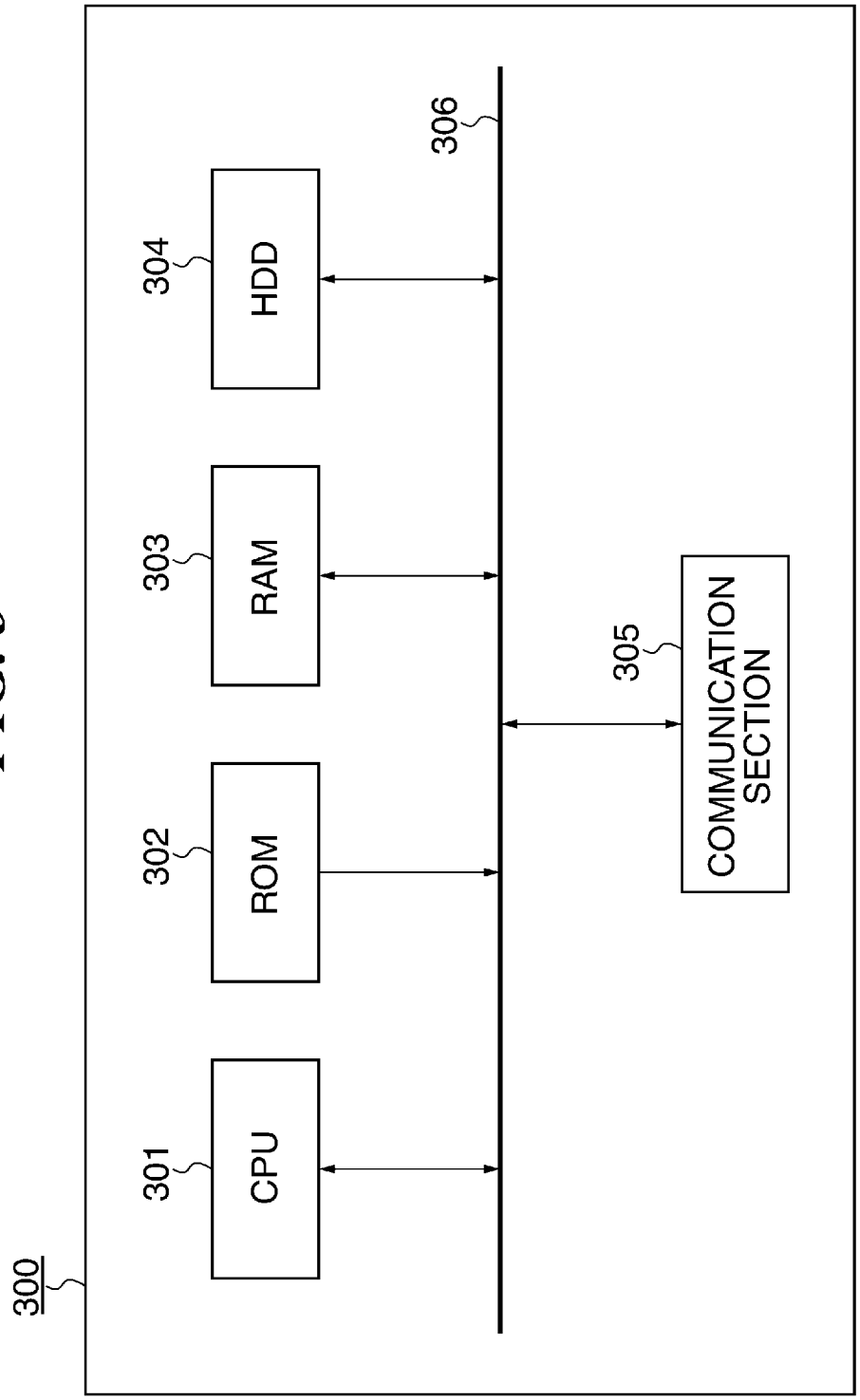

FIG. 7

| GROUPING ID | DEVICE IDENTIFIER | SET SERVER INFORMATION ||
| --- | --- | --- | --- |
| | | URL | USER ACCOUNT INFORMATION |
| GROUP 1 | AAA | http://www.xxx.com | user001 |
| | BBB | http://www.yyy.com | user002 |
| | CCC | http://www.zzz.com | user003 |

FIG. 8

○ : PERMITTED TO BE UPLOADED
× : INHIBITED TO BE UPLOADED

| IMAGE | DEVICE ID |
|---|---|
| DATA 1 | ○ |
| DATA 2 | × |
| DATA 3 | × |
| DATA 4 | ○ |
| ⋮ | ⋮ |
| DATA (X-2) | ○ |
| DATA (X-1) | ○ |
| DATA X | × |

FIG. 9

| GROUPING ID | DEVICE ID | STORAGE LOCATION OF UPLOADED IMAGE |
|---|---|---|
| GROUP 1 | AAA | http://www.xxx.com/user15436/uploadpage111 |
| | BBB | http://www.yyy.com/id00431/20101209 |
| | CCC | http://www.zzz.com/info?user=x6z1&pageid=255 | ized

INFORMATION PROCESSING APPARATUS THAT UPLOADS IMAGES HELD BY A PLURALITY OF DEVICES TO SERVERS SET ON A DEVICE-BY-DEVICE BASIS, METHOD OF CONTROLLING THE SAME, AND STORAGE MEDIUM

BACKGROUND OF THE INVENTION

Field of the Invention

The present invention relates to an information processing apparatus that uploads images held by a plurality of devices detected thereby to servers set on a device-by-device basis, for storage therein, and causes the devices to share information on the servers storing the images, a method of controlling the same, and a storage medium.

Description of the Related Art

In recent years, there has been widely used an online service for uploading images recorded by a digital camera or the like to a server, and causes a person who desires to share the images to be notified of information including a link to a storage site where the images are stored, using an email. The person having received the email can access the storage site linked in the body of the email using browser software.

In such an online service, by uploading images to one server, a plurality of persons can access the uploaded images, and hence it is convenient for users who desire to share a lot of images with a plurality of persons.

On the other hand, conventionally, there has been proposed a technique for collectively uploading still images and moving images of video taken from a digital video camera to an image server (see e.g. Japanese Patent Laid-Open Publication No. 2002-101373).

The proposed technique eliminates the need of knowledge of a procedure concerning construction of a web site and a network which are necessary for uploading images to a server on the Internet. Further, the technique facilitates copying an image to be uploaded to a designated location in the server, selecting a file of the image on the browser, and like other processing.

However, in the technique described in Japanese Patent Laid-Open Publication No. 2002-101373, in a case where a plurality of users on the same trip desire to share images photographed during the trip between them, by using the online service to upload images to a server, each user is required to perform the same operation for image sharing.

As the number of the plurality of users desiring to share the images is larger, more burden of the operation is placed on the users.

SUMMARY OF THE INVENTION

The present invention provides an information processing apparatus capable of reducing the burden of user's operation required to be performed for sharing uploaded images between a plurality of users, in a case where image upload destinations set by the users using their own devices, respectively, are different, a method of controlling the information processing apparatus, and a storage medium.

In a first aspect of the present invention, there is provided an information processing apparatus comprising a detection unit configured to detect a device that holds image information, a device communication unit configured to communicate with the device in a state detected by the detection unit, a server communication unit configured to communicate with a plurality of servers via a communication network, a server information acquisition unit configured to acquire server information indicative of image upload destinations set by a plurality of the devices each detected within a predetermined time period by the detection unit, respectively, via the device communication unit, an image information acquisition unit configured to acquire image information held by each device detected within the predetermined time period by the detection unit, via the device communication unit, and an upload unit configured to upload the image information acquired by the image information acquisition unit to the plurality of servers corresponding to the server information acquired by the server information acquisition unit, via the server communication unit.

In a second aspect of the present invention, there is provided a method of controlling an information processing apparatus including a detection unit configured to detect a device that holds image information, a device communication unit configured to communicate with the device in a state detected by the detection unit, and a server communication unit configured to communicate with a plurality of servers via a communication network, the method comprising acquiring server information indicative of image upload destinations set by a plurality of the devices each detected within a predetermined time period by the detection unit, respectively, via the device communication unit, acquiring image information held by each device detected within the predetermined time period by the detection unit, via the device communication unit, and uploading the acquired image information to the plurality of servers corresponding to the acquired server information, via the server communication unit.

In a third aspect of the present invention, there is provided a non-transitory computer-readable storage medium storing a computer-executable control program for causing a computer to execute a method of controlling an information processing apparatus including a detection unit configured to detect a device that holds image information, a device communication unit configured to communicate with the device in a state detected by the detection unit, and a server communication unit configured to communicate with a plurality of servers via a communication network, wherein the method comprises acquiring server information indicative of image upload destinations set by a plurality of the devices each detected within a predetermined time period by the detection unit, respectively, via the device communication unit, acquiring image information held by each device detected within the predetermined time period by the detection unit, via the device communication unit, and uploading the acquired image information to the plurality of servers corresponding to the acquired server information, via the server communication unit.

According to the present invention, in a case where image upload destinations set by the users using their own devices, respectively, are different, it is possible to reduce the burden of user's operation required to be performed for sharing uploaded images between the users.

Further features of the present invention will become apparent from the following description of exemplary embodiments (with reference to the attached drawings).

BRIEF DESCRIPTION OF THE DRAWINGS

FIG. 3 is a block diagram of the internal construction of a server connected to a server communication section of the information processing apparatus via a communication network.

FIG. 7 is a diagram showing an example of grouping information generated based on server information acquired from the three devices.

FIG. 8 is a diagram showing an example of information indicative of permission or inhibition of upload of image information to the server, which is set in each device in advance as additional information for each image in advance.

FIG. 9 is a diagram showing an example of list information generated based on storage location information of uploaded images.

DESCRIPTION OF THE EMBODIMENTS

The present invention will now be described in detail below with reference to the accompanying drawings showing embodiments thereof.

Figure 1:
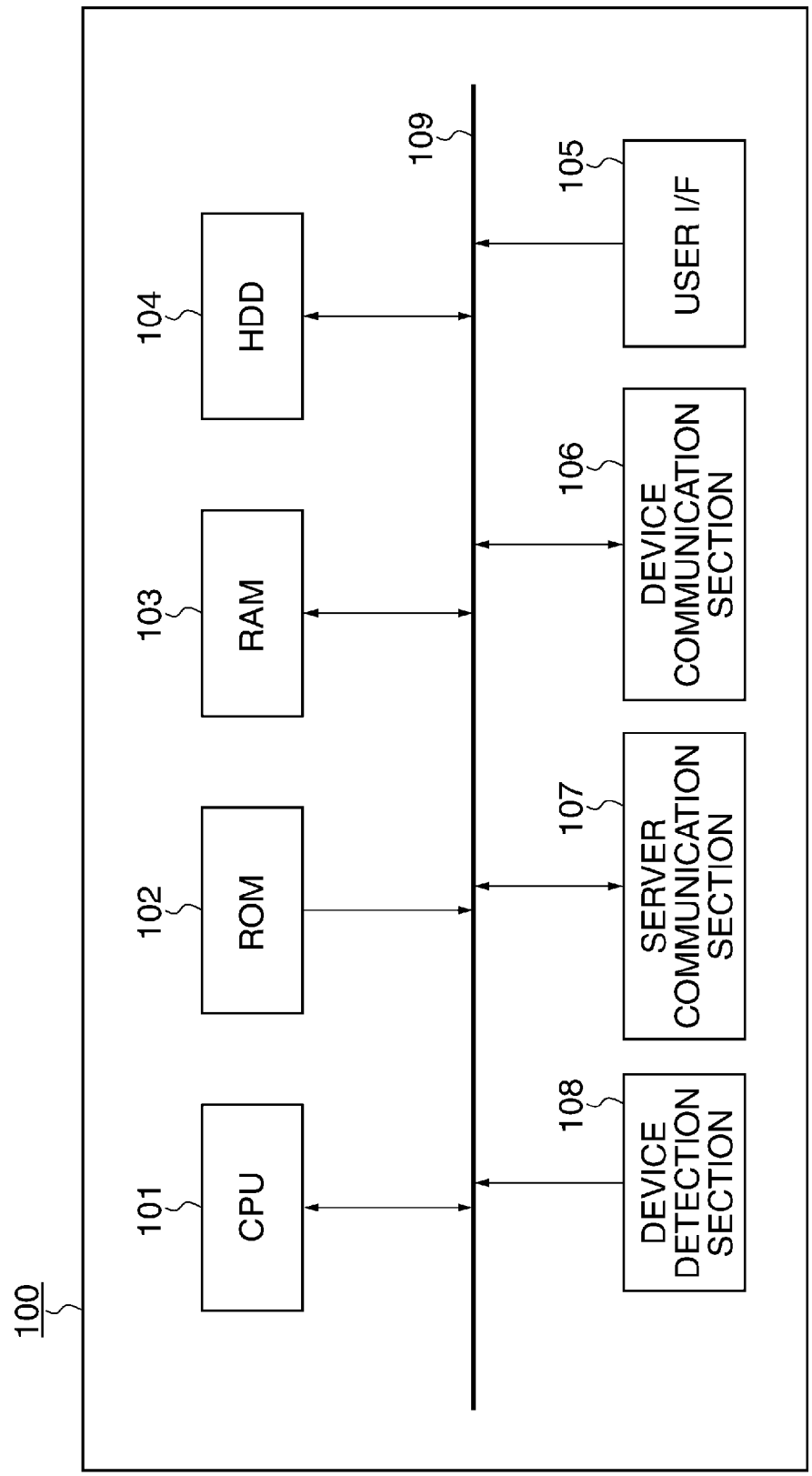
FIG. 1 is a block diagram of the internal construction of an information processing apparatus according to a first embodiment of the present invention.

FIG. 1 is a block diagram of the internal construction of an information processing apparatus according to a first embodiment of the present invention.

Referring to FIG. 1, a CPU 101 controls the overall operation of the information processing apparatus, denoted by reference numeral 100. A ROM 102 is a memory that stores programs for controlling the information processing apparatus 100, including an operating system (OS) and data used by the programs.

The ROM 102 stores a device detection & management program for identifying a device permitted to perform communication with the information processing apparatus 100 out of devices 200 (see FIG. 2) detected by a device detection section 108, and generating a device ID (identifier) to manage the identified device. Further, the ROM 102 stores a grouping & management program for grouping and managing a plurality of devices which are objects to be caused to share information acquired by communication performed by the information processing apparatus 100.

Further, the ROM 102 stores a set server information acquisition program for acquiring server information of a server 300 (see FIG. 3) set as an image upload destination by each of the devices 200 forming the group. Further, the ROM 102 stores an image information acquisition program for acquiring image information held by each device 200. Furthermore, the ROM 102 stores an upload program for uploading the image information acquired from each device 200 to the server 300 set as the image upload destination.

A RAM 103 is a rewritable memory used as a work area for the programs that control the information processing apparatus 100. An HDD 104 is a hard disk drive for holding a large amount of various information managed by the information processing apparatus 100. A user interface 105 is an interface for notifying the CPU 101 of an instruction input by a user's operation.

A device communication section 106 wirelessly communicates with a device 200 detected by the device detection section 108. A server communication section 107 communicates with the server 300 connected via the communication network. The device detection section 108 detects a device 200 in an area within which the information processing apparatus 100 performs communication with other devices 200. A bus 109 is a transmission path for transmitting control signals and data signals between the component elements.

Figure 2:
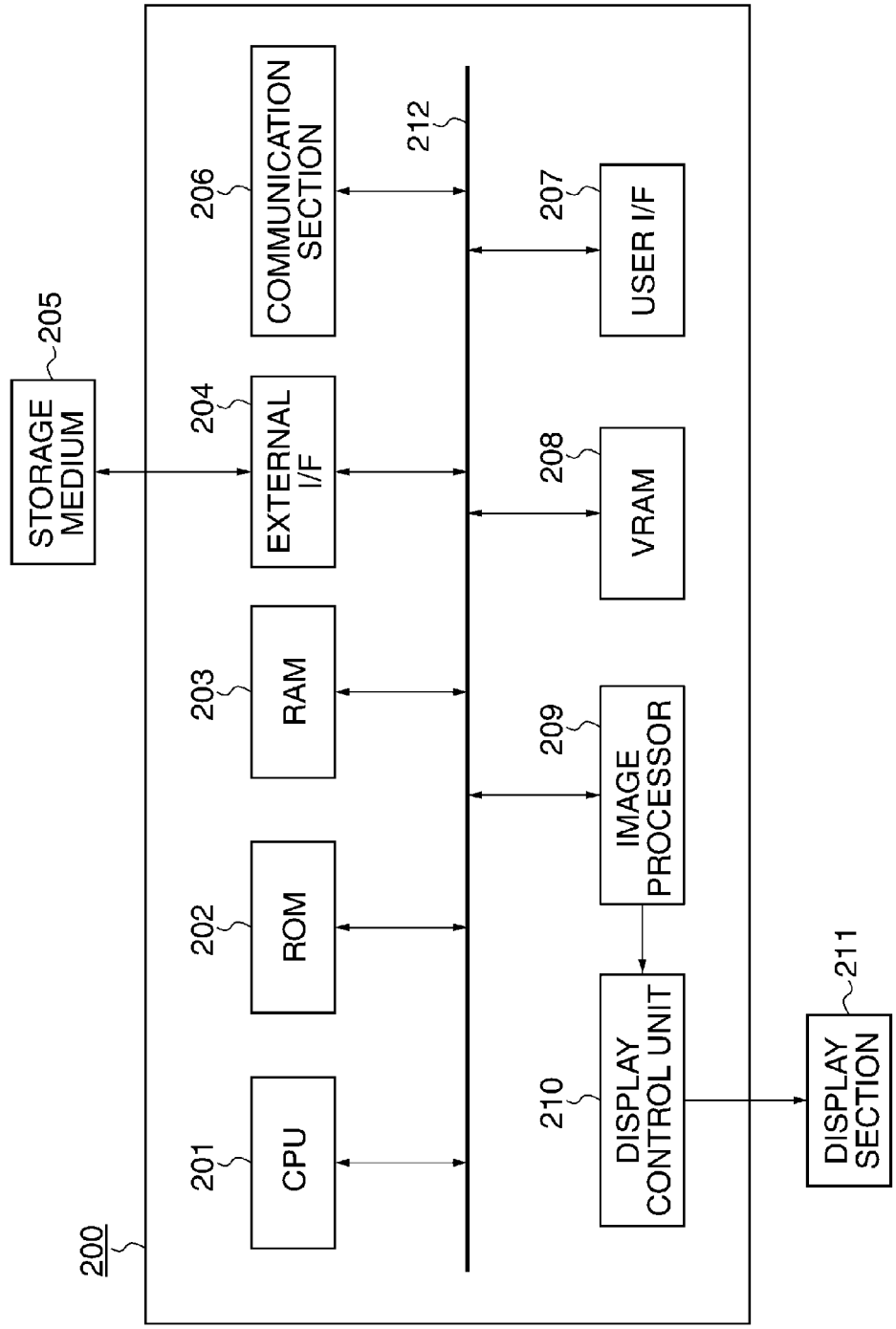
FIG. 2 is a block diagram of the internal construction of a device to be detected by a device detection section of the information processing apparatus.

FIG. 2 is a block diagram of the internal construction of each device 200 to be detected by the device detection section 108 of the information processing apparatus 100.

Referring to FIG. 2, a CPU 201 controls the overall operation of the device 200. A ROM 202 is a memory that stores programs for controlling the device 200, including an operating system (OS) and data used by the programs. A RAM 203 is a rewritable memory used as a work area for the programs that control the device 200.

An external interface 204 is an interface for reading data recorded in an external storage medium 205, such as a memory card, or writing data into the storage medium 205, according to an instruction from the CPU 201. A communication section 206 wirelessly communicates with the device communication section 106 of the information processing apparatus 100.

A user interface 207 is an interface for notifying the CPU 201 of an instruction input by a user's operation. The user interface 207 includes various operation buttons for operating the device 200, and a user can perform setting of server information of the server 300 which is an upload destination of images held in the storage medium 205, and setting of images to be uploaded, by operating the various operation buttons.

A VRAM 208 is used as a buffer for holding an image rendered by an image processor 209 until it is scanned on the screen. The image processor 209 receives coordinates of image data drawn on a screen of a display section 211 from the CPU 201, calculates a display location of each dot on the image, and temporarily stores the information in the VRAM 208. Further, the image processor 209 reads the information stored in the VRAM 208 at a predetermined timing, and transfers the read information to a display control unit 210.

The display control unit 210 converts the image data stored in the VRAM 208 to a digital signal which can be displayed by the display section 211, and outputs the converted signal. The display section 211 is implemented e.g. by an LCD, and displays the image data output from the display control unit 210. A bus 212 is a transmission path for transmitting control signals and data signals between the component elements.

FIG. 3 is a block diagram of the internal construction of the server 300 connected to the server communication section 107 of the information processing apparatus 100 via the communication network.

Referring to FIG. 3, a CPU 301 controls the overall operation of the server 300. A ROM 302 is a memory that stores programs for controlling the server 300, including an operating system (OS) and data used by the programs. A RAM 303 is a rewritable memory used as a work area for the programs that control the server 300.

An HDD 304 is a hard disk drive that stores image data received from the information processing apparatus 100. A communication section 305 communicates with the server communication section 107 of the information processing apparatus 100 connected via the communication network. A bus 306 is a transmission path for transmitting control signals and data signals between the component elements.

When a user having accessed the server 300 via the communication network completes user registration by inputting information according to a predetermined registration method designated by the information processing apparatus 100, the server 300 reserves an area for storing images in the HDD 304, and generates user account information associated with the reserved area.

The user account information indicates an authentication key used when the registered user accesses the above-mentioned image storage area reserved in the HDD 304. The server 300 generates the user account information by assigning a unique character string, and records the generated user account information in the HDD 304.

Further, when the server 300 receives user account information, the server 300 allows the device 200 having sent the user account information to access the image storage area in the HDD 304, which is reserved for the user identified by the user account information.

Figure 4A:
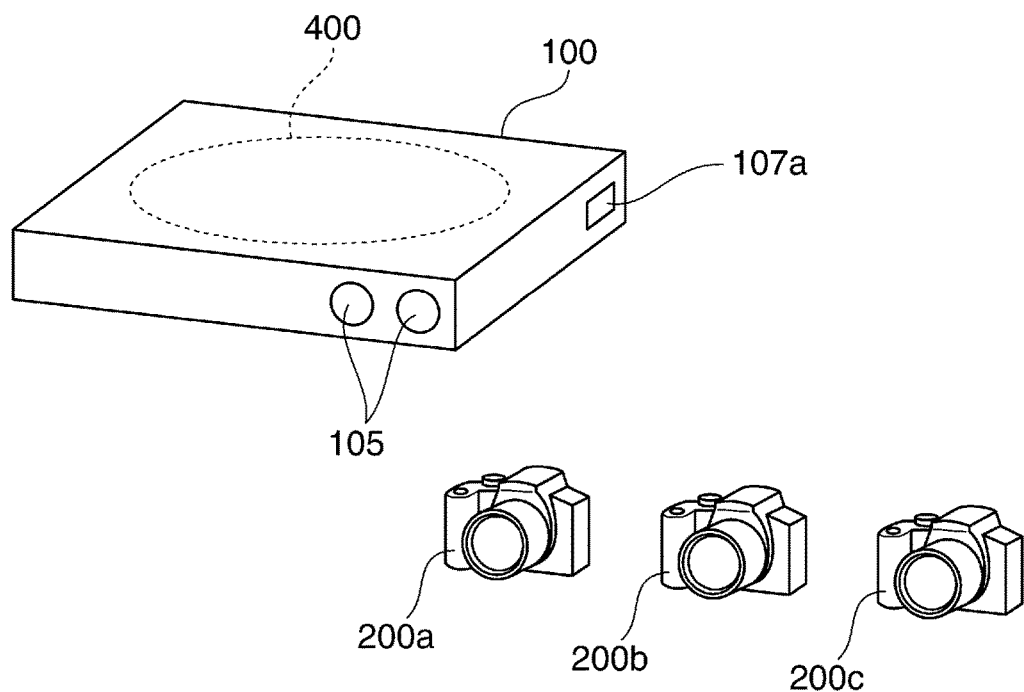
FIG. 4A is a schematic perspective view of the information processing apparatus and three devices.
Figure 4B:
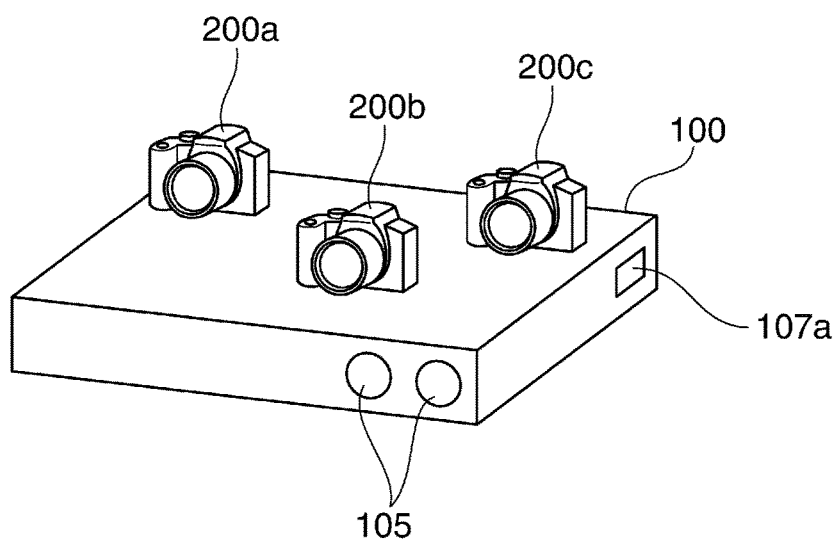
FIG. 4B is a schematic perspective view of the information processing apparatus in a state in which the three devices are placed on a detection area thereof.

FIG. 4A is a schematic perspective view of the information processing apparatus 100 and three devices 200a, 200b, and 200c. FIG. 4B is a schematic perspective view of the information processing apparatus 100 in a state in which the three devices 200a, 200b, and 200c are placed on a detection area 400 thereof. In the present embodiment, image pickup devices, such as digital cameras, are shown as the three devices 200a, 200b, and 200c, by way of example.

Referring to FIG. 4A, the detection area 400 is an area in which the device detection section 108 detects placement of each of the devices 200a, 200b, and 200c, e.g. based on a change in pressure or by short distance wireless communication. A LAN connector 107a forms part of the server communication section 107. In the present embodiment, it is assumed that photographing has been performed by the devices 200a, 200b, and 200c, and image data has been recorded in the storage medium 205 of each of them in advance. Further, the image data may be recorded together with metadata or the like. In the present embodiment, information including image data itself or a file path (storage location information) of the image data itself is hereinafter referred to as the image information.

Then, as shown in FIG. 4B, when the devices 200a, 200b, and 200c are placed on the detection area 400 of the information processing apparatus 100, this state is detected by the device detection section 108. The CPU 101 acquires server information and image information from the detected devices 200a, 200b, and 200c via the device communication section 106 using wireless communication, and then uploads the image information to the servers 300 indicated by the server information via the server communication section 107. Note that in the present embodiment, as image information, image data itself and a file path (storage location information) of the image data are uploaded, and each device 200 downloads the image data based on the file path of the image information.

Figure 5:
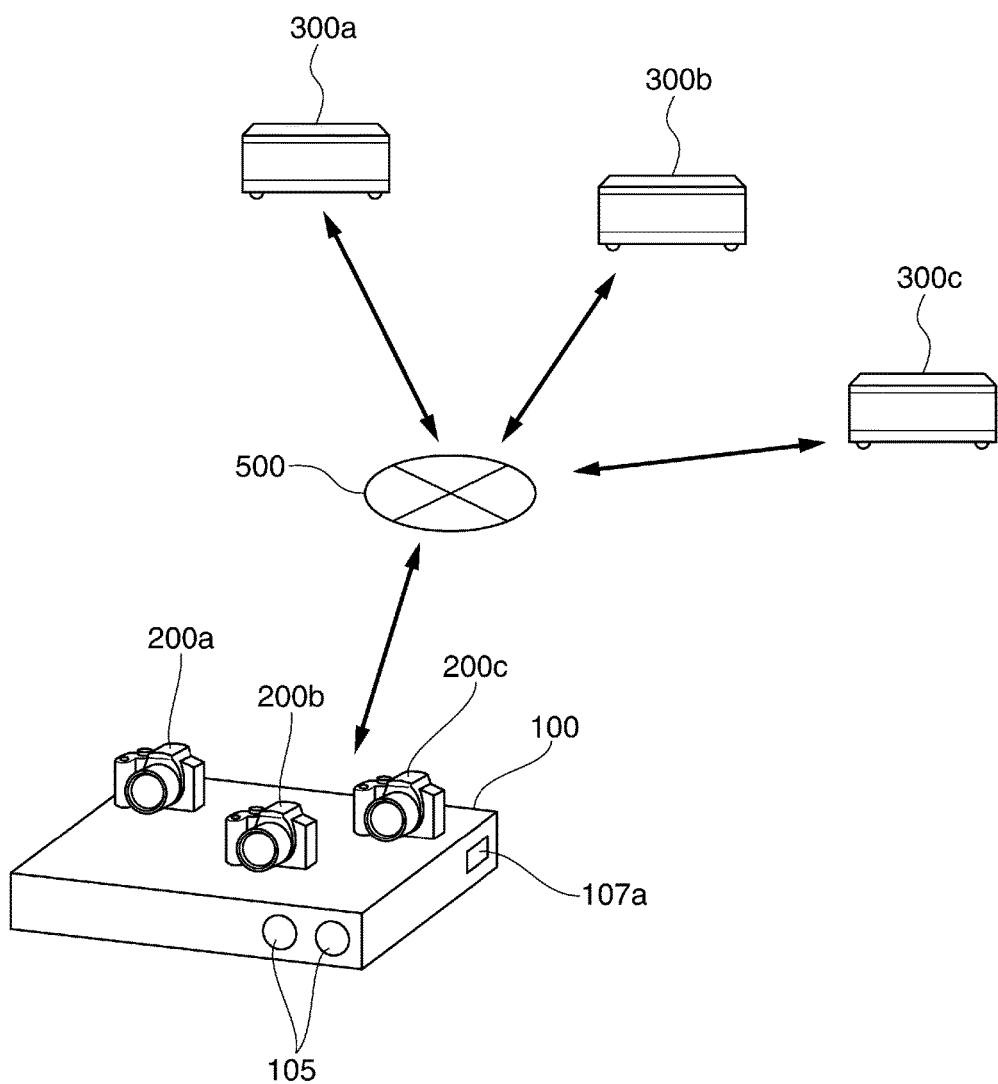
FIG. 5 is a schematic perspective view of the information processing apparatus in a state communicating with respective servers set for the three devices.

FIG. 5 is a schematic perspective view of the information processing apparatus 100 in a state communicating with the servers, denoted by reference numerals 300a, 300b, and 300c, set for the devices 200a, 200b, and 200c, respectively.

In FIG. 5, the server 300 set by the device 200a as an image upload destination is denoted as the server 300a, and the server 300 set by the device 200b as an image upload destination is denoted as the server 300b. Further, the server 300 set by the device 200c as an image upload destination is denoted as the server 300c. The information processing apparatus 100 and the servers 300a, 300b, and 300c are mutually communicably connected via the communication network, denoted by reference numeral 500.

Figure 6:
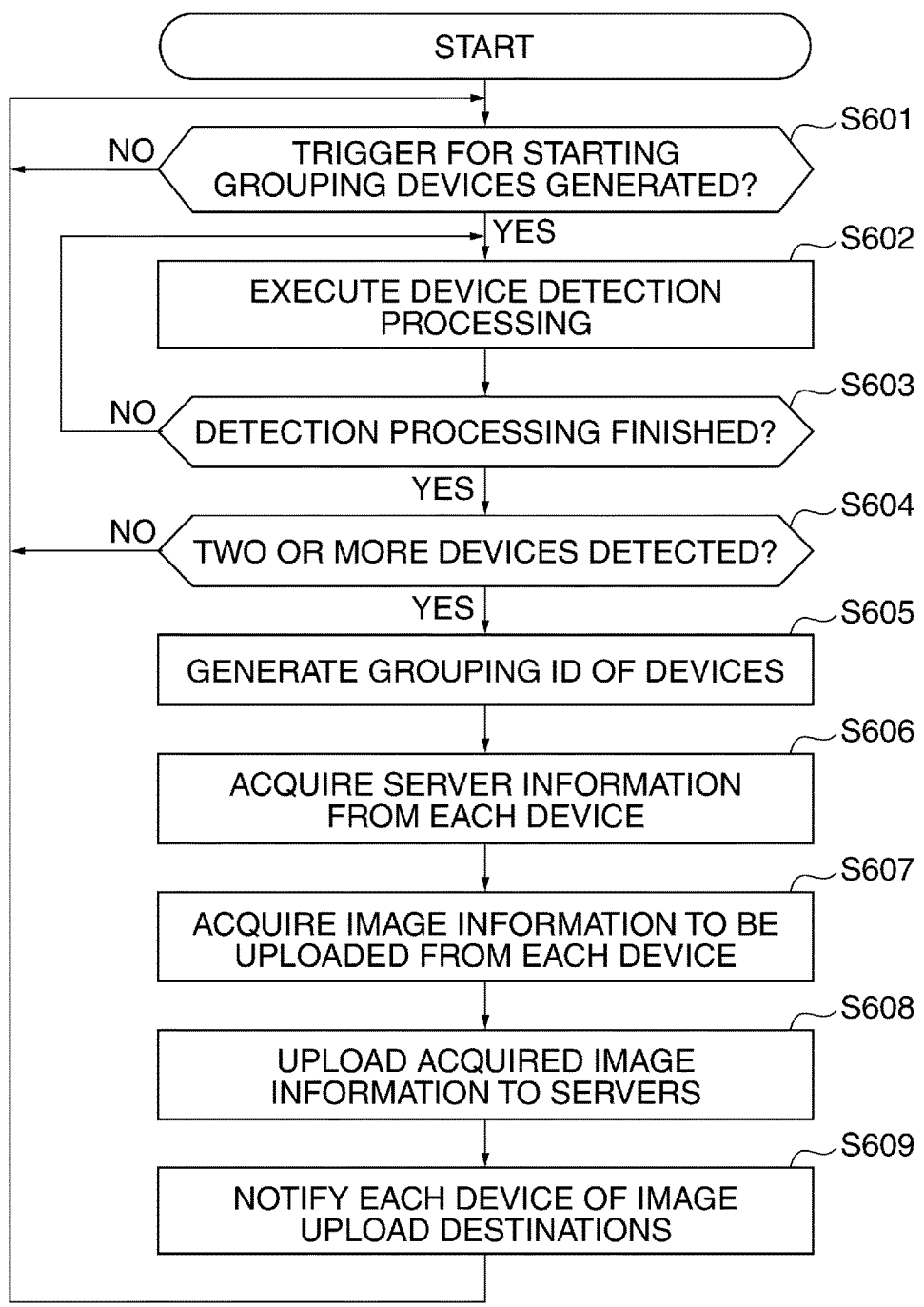
FIG. 6 is a flowchart of a group upload process performed by the information processing apparatus in the case of the example shown in FIG. 5.

FIG. 6 is a flowchart of a group upload process performed by the information processing apparatus 100 in the case of the example shown in FIG. 5. The group upload process in FIG. 6 is executed by the CPU 101 according to a program which is stored in the ROM 102 of the information processing apparatus 100 and is loaded into the RAM 103.

Referring to FIG. 6, in a step S601, the CPU 101 monitors the starting timing of a process (grouping process) for setting a plurality of devices 200 as a group of devices to be caused to share information on the image storage area in the server 300 between them.

More specifically, when the device detection section 108 has detected placement of devices on the detection area 400 of the information processing apparatus 100, the CPU 101 detects generation of a trigger for starting the device grouping process, and proceeds to a step S602.

In the step S602, the CPU 101 performs, according to a device detection program, a predetermined authentication procedure with a detected device via the device communication section 106 to determine whether or not the detected device is a device 200 permitted to perform communication with the information processing apparatus 100.

Then, if it is determined that the detected device is a device 200 permitted to perform communication with the information processing apparatus 100, the CPU 101 acquires device identification information, such as an IP address or a MAC address, specific to the device. Then, the CPU 101 generates a device ID corresponding to the acquired identification information, records the generated identifier in the RAM 103, and proceeds to a step S603. On the other hand, if it is determined that the detected device is not a device 200 permitted to perform communication with the information processing apparatus 100, the CPU 101 proceeds to the step S603 without generating the device ID.

In the step S603, the CPU 101 determines whether or not a predetermined time period has elapsed after detection of a first device in the step S602. This predetermined time period is set beforehand by the user operating the user interface 105.

The CPU 101 repeats the step S602 until the set time period elapses, and when the set time period has elapsed, the CPU 101 judges that the detection process is finished, and proceeds to a step S604.

In the step S604, the CPU 101 determines whether or not the number of devices 200 permitted to perform communication with the information processing apparatus 100, detected in the steps S602 and S603, is equal to or more than two. Then, if the number of detected devices 200 permitted to perform communication is less than two, the grouping cannot be executed, and hence the CPU 101 returns to the step S601, whereas if the number of detected devices 200 is equal to or more than two, the CPU 101 proceeds to a step S605.

In the step S605, the CPU 101 generates one grouping ID (identifier) representing a group of the device IDs of the two or more devices 200 permitted to perform communication with the information processing apparatus 100, records the grouping ID in the RAM 103, and proceeds to a step S606.

In the step S606, the CPU 101 acquires the server information of an image upload destination from each of the devices 200, which are grouped in the step S605, according to the set server information acquisition program. The acquired server information includes the user account information for logging into the server 300.

Note that the CPU 101 may store the server information, which has been acquired from each device 200 in the step S606, in the HDD 104 in association with the identification information acquired in the step S602, and if the same device 200 is detected next time, instead of executing the acquisition process in the step S606, the CPU 101 may read the server information associated with the identification information of the device 200 to thereby acquire the server information.

Then, the CPU 101 associates the acquired server information with each device ID and the grouping ID of the devices 200, generated in the step S602 to thereby record the associated information in the RAM 103 as the grouping information, and proceeds to a step S607. FIG. 7 shows an example of the grouping information generated based on the server information acquired from the three devices 200a, 200b, and 200c.

In the step S607, the CPU 101 acquires the image information from the devices 200 having been grouped in the step S605, according to the image information acquisition program, and proceeds to a step S608. The image information to be acquired in this step can be determined according to additional information of the image.

For example, as shown in FIG. 8, the user of the device 200a sets information indicative of permission or inhibition of upload of image information to the server 300a as additional information for each image in advance. The additional information is stored in the storage medium 205 in association with the image information, and is transmitted to the information processing apparatus 100 together with the associated image information. The CPU 101 reads the additional information and acquires the image information permitted to be uploaded from the device 200a.

In the step S608, the CPU 101 uploads the image information permitted to be uploaded including the associated image data, acquired in the step S607, to the server 300 set in the server information acquired in the step S606, according to the upload program.

In the present embodiment, if each device 200 allows the image information to be uploaded to a server 300, which is set for the self-device 200, the CPU 101 also uploads the image information to a server 300 set for the other device 200. That is, out of the image information held by the device 200a, the image information permitted to be uploaded to the server 300a is also uploaded to the server 300b set for the device 200b.

However, this is not limitative, but each device 200 may set whether or not to permit image information to be uploaded to a server 300 set for the self-device and whether or not to permit image information to be uploaded to a server 300 set for the other device 200, separately, on an image information item-by-image information item basis. By doing so, out of the image information items held in the device 200a, ones permitted to be uploaded to the other server 300 are uploaded to the server 300b set for the device 200b.

Then, the CPU 101 acquires storage location information (file path) of the image information uploaded by the devices 200 from the server 300, generates list information by associating the acquired storage location information with the device IDs and the grouping ID of the devices 200, records the generated list information in the RAM 103, and proceeds to a step S609. FIG. 9 shows an example of the list information generated in the step S608.

In the step S609, the CPU 101 notifies all of the devices 200 grouped in the step S605 of the image storage location information acquired from the servers 300 which are the image upload destinations of the respective devices 200, according to the list information generated in the step S608, and returns to the step S601.

Note that the CPU 101 may acquire all image information items from each device 200, and upload only permitted image information to the server 300 based on the additional information of the image information.

Further, the CPU 101 may store the image information acquired in the step S607 in the HDD 104, and select according to a user's operation between a first mode in which the acquired image information is uploaded to the server and a second mode in which the image information is only stored in the HDD 104 but is not uploaded to the server. Further, the image information uploading process in the present embodiment may be configured in advance such that it is to be executed when the first mode is selected according to the user's operation and is not to be executed when the second mode is selected according to the same. Further, the user may be enabled to select, when the first mode is selected, whether to store the image information in the HDD 104 even after the image information has been uploaded, or delete the image information from the HDD 104 after the image information has been uploaded.

Next, a description will be given of a communication process performed by the device 200 which communicates with the information processing apparatus 100, with reference to FIG. 10. Here, a case is described, by way of example, where the device 200a appearing in FIG. 4A is placed on the detection area 400 of the information processing apparatus 100. Steps in FIG. 10 are executed by the CPU 201 according to a program which is stored in the ROM 202 of the device 200a and is loaded into the RAM 203.

Figure 10:
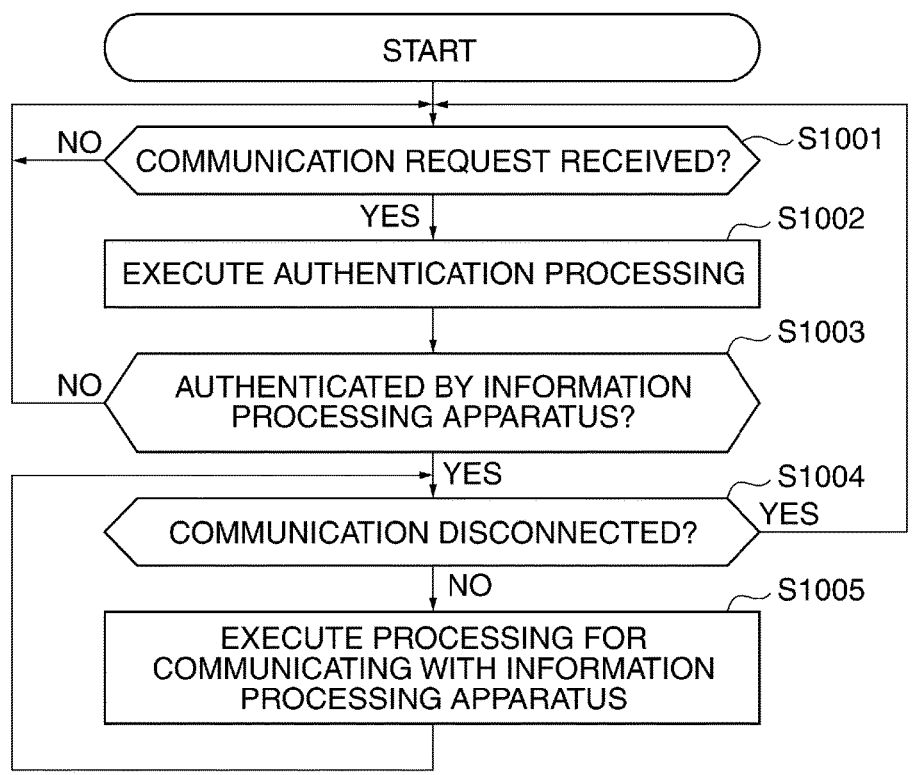
FIG. 10 is a flowchart of a communication process performed by the device which communicates with the information processing apparatus.

Referring to FIG. 10, in a step S1001, the CPU 201 monitors whether or not a communication request is received from the information processing apparatus 100 via the communication section 206, and if a communication request is received, the CPU 201 proceeds to a step S1002.

In the step S1002, the CPU 201 performs the authentication procedure for communicating with the information processing apparatus 100, and proceeds to a step S1003. More specifically, the CPU 201 executes processing for authentication as to whether or not the device 200a is allowed to perform communication with the information processing apparatus 100.

In the step S1003, the CPU 201 receives a result of the authentication from the information processing apparatus 100, and determines, based on the received result, whether or not the device 200a is authenticated by the information processing apparatus 100. Then, if the device 200a is authenticated by the information processing device 100, the CPU 201 proceeds to a step S1004, whereas if not, the CPU 201 returns to the step S1001.

In the step S1004, the CPU 201 determines whether or not wireless communication with the information processing apparatus 100 is disconnected, and if wireless communication is disconnected, the CPU 201 returns to the step S1001, whereas if wireless communication is maintained, the CPU 201 proceeds to a step S1005.

In the step S1005, the CPU 201 executes processing corresponding to the steps S606 and S607 in FIG. 6, for transmitting the server information and the image information, requested from the information processing apparatus 100, to the information processing apparatus 100.

Further, the CPU 201 executes processing associated with the step S609 in FIG. 6, for receiving information indicative of the image storage locations in the servers 300*a*, 300*b*, and 300*c*, set for the devices 200*a*, 200*b*, and 200*c*, respectively, which have been grouped by the information processing apparatus 100, and records the received information e.g. in the storage medium 205. Note that the step S1005 is repeated as long as connection of wireless communication is maintained in the step S1004.

As described above, in the present embodiment, in a case where image upload destinations set by a plurality of users using the respective devices 200*a*, 200*b*, and 200*c* are different from each other, it is possible to reduce the burden of user's operation required to be performed for sharing uploaded images between the plurality of users.

Although in the present embodiment, in the step S601 in FIG. 6, grouping the devices 200 is started when the first device 200 is detected, this is not limitative, but, for example, detection of the devices 200 to be grouped may be started and terminated based on instructions input by the user's operation on the use interface 105.

Further, in the present embodiment, it is assumed that the devices grouped in the step S605 in FIG. 6 are not carried off the detection area 400 of the information processing apparatus 100 until transmission of the image storage location information is executed in the step S609.

However, to share the information of the image storage locations in the server also with a device which is carried off in the course of processing, there may be employed the following method.

The CPU 101 monitors the state of detection of each device after the grouping ID of the devices is generated in the step S605 until the image storage location information is transmitted to each device in the step S609.

Then, even if one device is carried off to invalidate the detection thereof, when the one device is detected again, the CPU 101 transmits the image storage location information of the other grouped devices to the one device.

Next, a description will be given of an information processing apparatus according to a second embodiment of the present invention with reference to FIGS. 11 and 12. Note that elements overlapping with or corresponding to those of the first embodiment are denoted by the same reference numerals, and only different points will be described.

In the present embodiment, a description will be given of the information processing apparatus 100 that downloads images stored in the servers 300*a*, 300*b*, and 300*c* using the image storage location information shared between the devices 200*a*, 200*b*, and 200*c*, which have been grouped in the first embodiment.

The information processing apparatus 100 according to the present embodiment has a download program stored in the ROM 102, for downloading images stored in the servers. Further, the device 200*a*, 200*b*, and 200*c* each hold the image storage location information of the grouped device 200*a*, 200*b*, and 200*c*.

Figure 11:
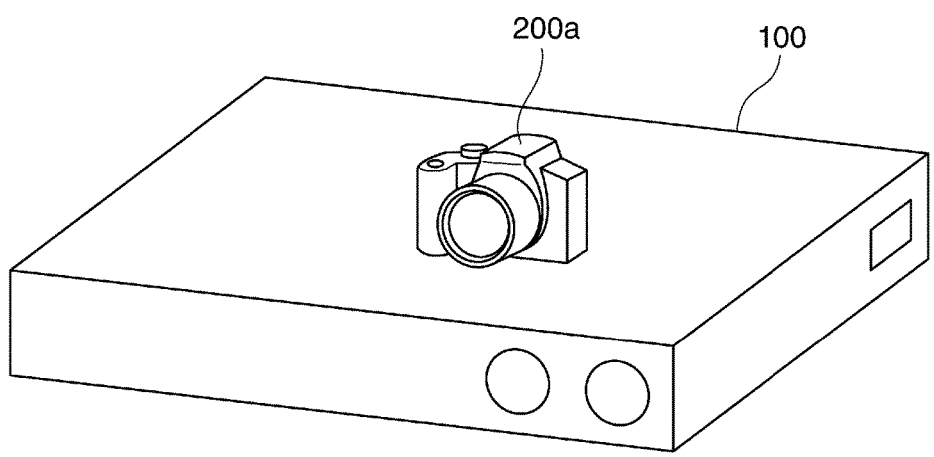
FIG. 11 is a schematic perspective view of the information processing apparatus according to a second embodiment of the present invention in a state in which the device is placed on the detection area.

FIG. 11 is a schematic perspective view of the information processing apparatus 100 according to the second embodiment in a state in which the device 200*a* is placed on the detection area 400 thereof.

As shown in FIG. 11, when the device 200*a* is placed on the detection area 400 of the information processing apparatus 100, the CPU 101 detects the device via the device detection section 108, and downloads images. A download process performed by the information processing apparatus 100 at this time will be described with reference to a flowchart in FIG. 12. The download process in FIG. 12 is executed by the CPU 101 according to the program which is stored in the ROM 102 of the information processing apparatus 100 and is loaded into the RAM 103.

Figure 12:
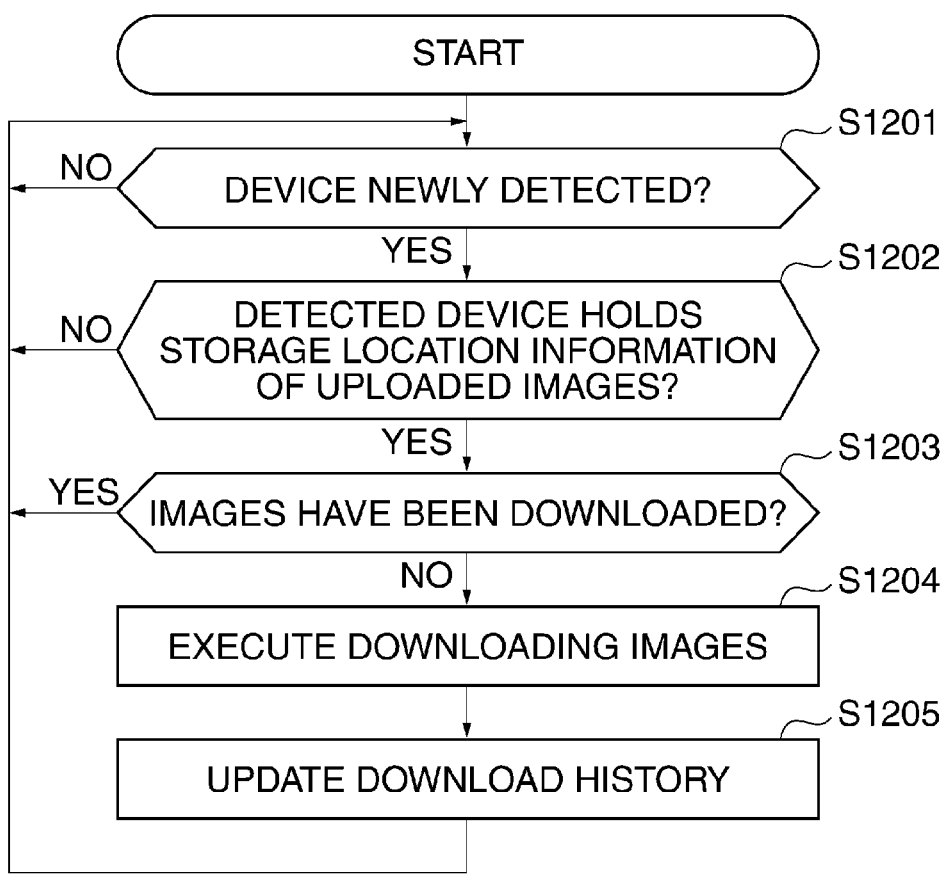
FIG. 12 is a flowchart of a download process for downloading an image from the server by the information processing apparatus.

Referring to FIG. 12, in a step S1201, when the device detection section 108 detects placement of the device 200*a* on the detection area 400 of the information processing apparatus 100, the CPU 101 proceeds to a step S1202.

In the step S1202, the CPU 101 determines whether or not the device 200*a* holds the image storage location information of uploaded images via the device communication section 106, and if the device 200*a* holds the image storage location information, the CPU 101 acquires the image storage location information, and proceeds to a step S1203.

In the step S1203, the CPU 101 determines, based on download history, whether or not images about to be downloaded, which are stored in the image storage location, have already been downloaded. If the images about to be downloaded have not been downloaded, but are to be downloaded for the first time, the CPU 101 proceeds to a step S1204.

In the step S1204, the CPU 101 downloads the images from the image storage locations in the server 300 designated in the image storage location information, according to the download program, stores the downloaded images in the HDD 104, and proceeds to a step S1205. Note that in the present embodiment, the images are downloaded from the respective image storage locations of the servers 300*a*, 300*b*, and 300*c*, which are the respective image upload destinations of the grouped devises 200*a*, 200*b*, and 200*c*.

In the step S1205, the CPU 101 creates list information of history records of the storage location information of the images which have been downloaded, records or updates the list information, and returns to the step S1201. By executing this process, when the information processing apparatus 100 detects the device 200*a* again, and executes the step S1203, it is possible to refer to the list information created in the step S1205 to thereby avoid downloading the same images again from the storage locations from which the images have been downloaded.

As described above, in the present embodiment, it is possible to download images stored in the servers 300*a*, 300*b*, and 300*c* to the information processing apparatus 100 using the image storage location information shared between the grouped devices 200*a*, 200*b*, and 200*c*. The other configuration and advantageous effects are the same as those provided by the first embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207206 filed Oct. 2, 2013 which is hereby incorporated by reference herein in its entirety.

What is claimed is:

1. An information processing apparatus configured to communicate with a plurality of devices and a plurality of storage sites to enable sharing of image information stored in the plurality of devices, the information processing apparatus comprising:
   a device detection area provided on a surface of the information processing apparatus and configured to detect the plurality of devices based on a change in pressure or by short distance wireless communication;
   a memory; and
   a processor connected to the memory and configured to execute instructions that, when executed, cause the information processing apparatus to:
      detect the plurality of devices placed within the device detection area, the plurality of devices each storing image information, each device of the plurality of devices detected within a predetermined time period;
      acquire respective storage site information indicative of an image upload destination, corresponding to a storage site of the plurality of storage sites, to store the images stored in each respective device of the plurality of devices;
      acquire image information stored in each respective device of the plurality of devices detected within the predetermined time period;
      upload the acquired image information from each respective device of the plurality of devices to the respective storage site of the plurality of storage sites, the respective storage site corresponding to the image upload destination for the corresponding respective device, based at least on the acquired respective storage site information; and
      notify other devices of the plurality of devices of the respective storage site for each corresponding respective device of the plurality of devices to enable sharing of image information stored in each device of the plurality of devices with the other devices of the plurality of devices.

2. The information processing apparatus according to claim 1, wherein the predetermined time period is a time period that elapses after a first device of the plurality of devices is detected.

3. The information processing apparatus according to claim 1, wherein the predetermined time period is an elapsed time period from a start of detection to an end of the detection of the plurality of devices, and wherein the detection of the plurality of devices is performed in response to a user operation.

4. The information processing apparatus according to claim 1, wherein the acquired respective storage site information includes user account information required to log into the respective storage site.

5. The information processing apparatus according to claim 1, wherein additional information indicative of whether or not to permit the image information to be uploaded to the respective storage site is stored in association with each of items of the image information held by the respective device, and
   wherein items of the image information permitted to be uploaded to the respective storage site are acquired based on the additional information.

6. The information processing apparatus according to claim 1, wherein additional information indicative of whether or not to permit the image information to be uploaded to the respective storage site is stored in association with each of items of the image information held by the respective device, and
   wherein items of the image information permitted to be uploaded to the respective storage site are uploaded to the respective storage site based on the additional information.

7. The information processing apparatus according to claim 1, wherein the processor is further configured to execute instructions that, when executed, cause the information processing apparatus to download image information stored in the respective storage site, and
   wherein the image information is downloaded from the respective storage site when the respective device stores information indicative of a storage location of image data in the respective storage site.

8. The information processing apparatus according to claim 7, wherein storage location information of downloaded images is managed as list information, and, in a case where the list information does not include storage location information of an image stored by the respective device, the image information is downloaded from the respective storage site.

9. The information processing apparatus according to claim 1, wherein the processor is further configured to execute instructions that, when executed, cause the information processing apparatus to monitor a detection state of the plurality of devices detected within the predetermined time period until the plurality of detected devices are notified of storage location information of image data in the respective storage site of the plurality of storage sites, and
   wherein, in a case where the detection state of one of the plurality of devices is invalidated by the monitoring, and the respective one device is detected again, the respective one device is notified of image storage location information of remaining devices of the plurality of devices detected within the predetermined time period.

10. A method of controlling an information processing apparatus configured to communicate with a plurality of devices and a plurality of storage sites to enable sharing of image information stored in the plurality of devices, the method comprising:
   detecting the plurality of devices placed within a device detection area provided on a surface of the information processing apparatus based on a change in pressure or by short distance wireless communication, each device of the plurality of devices detected within a predetermined time period, each device of the plurality of devices storing image information;

acquiring respective storage site information indicative of an image upload destination, corresponding to a storage site of the plurality of storage sites, to store the images stored in each respective device of the plurality of devices;

acquiring image information stored in each respective device of the plurality of devices detected within the predetermined time period;

uploading the acquired image information from each respective device of the plurality of devices to the respective storage site of the plurality of storage sites, the respective storage site corresponding to the image upload destination for the corresponding respective device, based at least on the acquired respective storage site information; and notifying other devices of the plurality of devices of the respective storage site for each corresponding respective device of the plurality of devices to enable sharing of image information stored in each device of the plurality of devices with the other devices of the plurality of devices.

11. A non-transitory computer-readable storage medium storing a computer-executable control program for causing a computer to execute a method of controlling an information processing apparatus configured to communicate with a plurality of devices and a plurality of storage sites to enable sharing of image information stored in the plurality of devices, the method comprising:

detecting the plurality of devices placed within a device detection area provided on a surface of the information processing apparatus based on a change in pressure or by short distance wireless communication, each device of the plurality of devices detected within a predetermined time period, each device of the plurality of devices storing image information;

acquiring respective storage site information indicative of an image upload destination, corresponding to a storage site of the plurality of storage sites, to store the images stored in each respective device of the plurality of devices;

acquiring image information stored in each respective device of the plurality of devices detected within the predetermined time period;

uploading the acquired image information from each respective device of the plurality of devices to the respective storage site of the plurality of storage sites, the respective storage site corresponding to the image upload destination for the corresponding respective device, based at least on the acquired respective storage site information; and notifying other devices of the plurality of devices of the respective storage site for each corresponding respective device of the plurality of devices to enable sharing of image information stored in each device of the plurality of devices with the other devices of the plurality of devices.

* * * * *